(12) United States Patent
Burges et al.

(10) Patent No.: US 8,977,537 B2
(45) Date of Patent: Mar. 10, 2015

(54) HIERARCHICAL MODELS FOR LANGUAGE MODELING

(75) Inventors: Chris J. C. Burges, Bellevue, WA (US);
Andrzej Pastusiak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 914 days.

(21) Appl. No.: 13/167,734

(22) Filed: Jun. 24, 2011

(65) Prior Publication Data

US 2012/0330647 A1 Dec. 27, 2012

(51) Int. Cl.
G06F 17/27 (2006.01)
G06F 17/28 (2006.01)

(52) U.S. Cl.
CPC .......... *G06F 17/277* (2013.01); *G06F 17/2818* (2013.01)
USPC .................................................. 704/9

(58) Field of Classification Search
USPC ...................................................... 704/1–10
See application file for complete search history.

(56) References Cited

U.S. PATENT DOCUMENTS

| | | | |
|---|---|---|---|
| 6,195,631 B1 | 2/2001 | Alshawi et al. | |
| 6,311,150 B1 | 10/2001 | Ramaswamy et al. | |
| 6,754,626 B2 | 6/2004 | Epstein | |
| 6,963,831 B1 | 11/2005 | Epstein | |
| 7,835,911 B2 | 11/2010 | Balchandran et al. | |
| 8,027,938 B1 * | 9/2011 | Xu et al. | 706/12 |
| 2004/0133560 A1 * | 7/2004 | Simske | 707/3 |
| 2009/0192781 A1 * | 7/2009 | Bangalore et al. | 704/2 |
| 2012/0278060 A1 * | 11/2012 | Cancedda et al. | 704/2 |

OTHER PUBLICATIONS

Etzioni et al., "Web-scale information extraction in KnowItAll (preliminary results)"; 13th International World Wide Web Conference; ACM Press, New York, New York; May 17-22, 2004; pp. 100-110.

Carlson et al.; "Toward an Architecture for Never-Ending Language Learning"; Proceedings of the 24th AAAI Conference on Artificial Intelligence; Jul. 11-15, 2010; Atlanta, Georgia.

Crestan et al.; "Web-scale knowledge extraction from semi-structured tables"; Proceedings of the 19th International Conference on World Wide Web; Raleigh, North Carolina; Apr. 26-30, 2010; pp. 1081-1082.

Ferrucci, David; "Build Watson: an overview of DeepQA for the Jeopardy! Challenge"; Proceedings of the 19th International Conference on Parallel Architectures and Compilation Techniques; Vienna, Austria; Sep. 11-15, 2010.

(Continued)

*Primary Examiner* — Abul Azad
(74) *Attorney, Agent, or Firm* — Sandy Swain; Judy Yee; Micky Minhas (57) ABSTRACT

The described implementations relate to natural language processing, and more particularly to training a language prior model using a model structure. The language prior model can be trained using parameterized representations of lexical structures such as training sentences, as well as parameterized representations of lexical units such as words or n-grams. During training, the parameterized representations of the lexical structures and the lexical units can be adjusted using the model structure. When the language prior model is trained, the parameterized representations of the lexical structures can reflect how the lexical units were used in the lexical structures.

20 Claims, 8 Drawing Sheets (56) References Cited

OTHER PUBLICATIONS

Turney, et al.; "From Frequency to Meaning: Vector Space Models of Semantics"; Journal of Artificial Intelligence Research; No. 37; Feb. 2010; pp. 141-188.

Richardson et al.; "Markov Logic Networks"; Machine Learning; vol. 62, Issue 1-2; Feb. 2006; Kluwer Academic Publishers; Hingham, Massachusetts; pp. 107-136.

Zettlemoyer, et al.; "Learning Context-Dependent Mappings from Sentences to Logical Form"; ACL/AFNLP 2009; pp. 976-984.

Mitchell, et al.; "Vector-based Models of Semantic Composition"; Proceedings of ACL-08: 2008; pp. 236-244.

Bengio, et al.; "A Neural Probabilistic Language Model"; Journal of Machine Learning Research; vol. 3; 2003; pp. 1137-1155.

Collobert, et al.; "Natural Language Processing (almost) from Scratch"; Journal of Machine Learning Research; 2000; pp. 1-48.

Sutskever, et al.; "Generating Text with Recurrent Neural Networks"; Proceedings of the 28th International Conference on Machine Learning; 2011.

Socher et al.; "Learning Continuous Phrase Representations and Syntactic Parsing with Recursive Neural Networks"; NIPS Deep Learning and Unsupervised Feature Learning Workshop; 2010.

Amini, et al., "The Use of Unlabeled Data to Improve Supervised Learning for Text Summarization", Retrieved at <<http://citeseerx.ist.psu.edu/viewdoc/download?doi=10.1.1.74.7425&rep=rep1&type=pdf>>, ACM/SIGIR International Conference on Research and Development in Information Retrieval, Aug. 11-15, 2002, pp. 105-112.

Pierce, et al., "Limitations of Co-Training for Natural Language Learning from Large Datasets", Retrieved at <<http://citeseerx.ist.psu.edu/viewdoc/download?doi=10.1.1.70.3484&rep=rep1&type=pdf>> In Proceedings of the 2001, conference on Empirical Methods in Natural Language processing, Jun. 3, 2001. pp. 9.

Mnih, et al., "A Scalable Hierarchical Distributed Language Model", Retrieved at <<http://www.cs.toronto.edu/~amnih/papers/hlbl_final.pdf>>, Dec. 9, 2008. pp. 1-8.

Ando, et al., "A High-Performance Semi-Supervised Learning Method for Text Chunking", Retrieved at <<http://riejohnson.com/rie/ando_zhang_ac105.pdf>> 43rd Annual Meeting of the Association for Computational Linguistics, Proceedings of the Conference, Jun. 25-30, 2005, pp. 9.

Bottou, Leon, "From Machine Learning to Machine Reasoning", Retrieved at <<http://arxiv.org/ftp/arxiv/papers/1102/1102.1808.pdf>> Feb. 8, 2011, pp. 15.

Collobert, et al., "Natural Language Processing (almost) from Scratch", Retrieved at <<http://leon.bottou.org/morefiles/nlp.pdf>>, Journal of Machine Learning Research, Oct. 2000, pp. 1-47.

\* cited by examiner

HIERARCHICAL MODELS FOR LANGUAGE MODELING

BACKGROUND

Natural language processing can be a difficult computational task. For example, the goal of building a machine that is generally capable of a meaningful discussion with a human user continues to elude researchers. While some natural language processing applications have met with success, these applications generally have certain drawbacks.

For example, some natural language processing applications are relatively successful, but they are constrained to a relatively narrow goal. As but one example, existing machine learning techniques can compile lists of known "facts" taken from natural language texts. However, these techniques have little applicability outside of the specific context of fact-gathering. Even applications that have broader applicability may require relatively intensive user supervision to achieve satisfactory results. For example, while voice recognition software works relatively well for many users, this often requires a user to invest time to train the software using his or her voice by correcting errors made by the software.

SUMMARY

This document relates to natural language processing. One implementation can create submodels that include lexical structure weights that are assigned to a lexical structure. The submodels can include an individual submodel that includes an individual weight that is assigned to the lexical structure. The implementation can also assign, as an input to the individual submodel, a lexical unit weight that is assigned to an individual lexical unit of the lexical structure. The individual submodel can perform an operation on the individual lexical structure weight assigned to the lexical structure and the lexical unit weight assigned to the individual lexical unit.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This document relates to natural language processing techniques performed on a computing device, and more particularly to creating and training a language prior model using unlabeled training sentences or other lexical structures. Generally speaking, the language prior model can use parameterized representations of the individual sentences and the words or other lexical units included therein. During training, the parameterized representations of the individual sentences and of the words can be adjusted using mathematical operations.

When the language prior model is trained, the parameterized representations of the words can reflect how the words were used in the training sentences. For example, words that are generally replaceable in a given sentence can have corresponding parameterized representations with relatively little distance between them. Conversely, words that are not suitable to replace one another can have corresponding parameterized representations with relatively great distances between them. In some implementations, the distance between parameterized representations for two words can be represented as a Euclidean distance. This can facilitate using the trained language prior model in a number of different applications, discussed in more detail below.

During training, the operations performed to train the language prior model can reflect the order of words in a training sentence. For example, the language prior model can be trained using a model structure with submodels included therein, some of which can be responsible for outputting individual words in the training sentence. A path through individual submodels in the model structure can be determined based on the order of words in the training sentence. Note that the term "language prior model" in this document can refer to a set of parameterized representations of lexical units. Those parameterized representations can be trained using a model structure that is also discussed herein.

Example System

Figure 1:
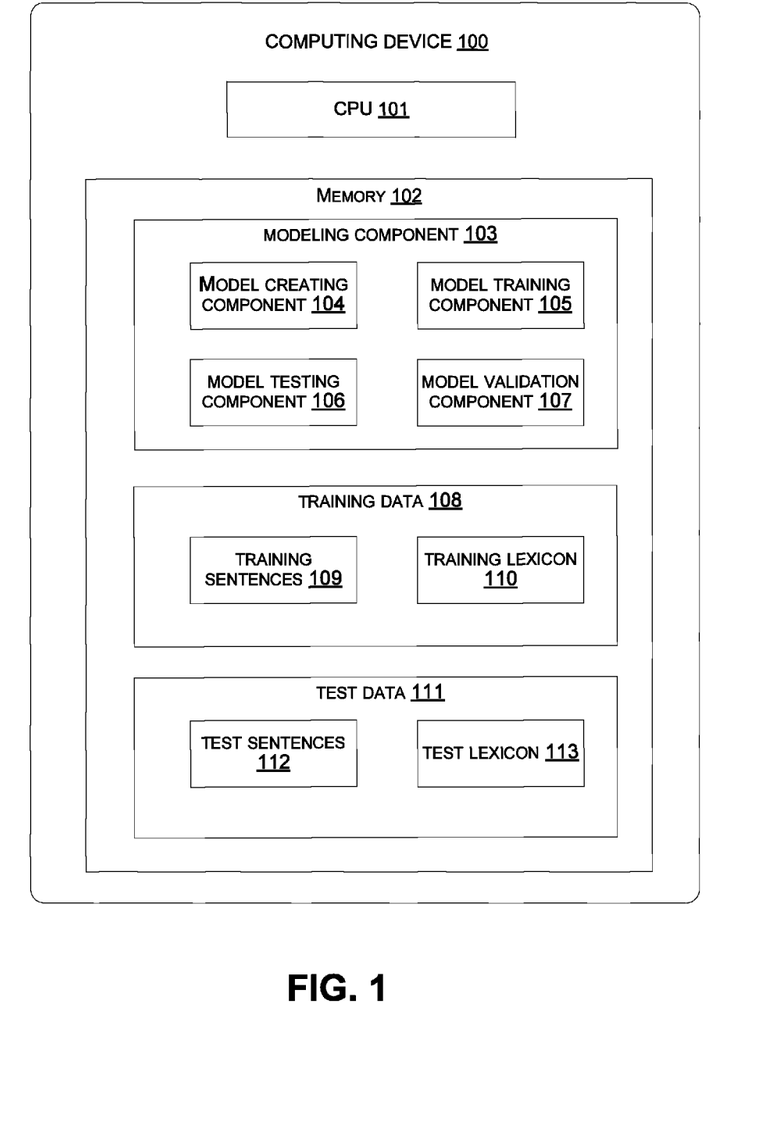
FIG. 1 shows an exemplary system that can be employed in accordance with some implementations of the present concepts.

For purposes of explanation, consider introductory FIG. 1. FIG. 1 shows an exemplary architecture of a computing device 100 that is configured to accomplish the concepts described above and below. Computing device 100 can include a central processing unit ("CPU") 101 that is operably connected to a memory 102. For example, CPU 101 can be a reduced instruction set computing (RISC) or complex instruction set computing (CISC) microprocessor that is connected to memory 102 via a bus.

Memory 102 can be a volatile storage device such as a random access memory (RAM), or a non-volatile memory such as FLASH memory. Although not shown in FIG. 1, computing device 100 can also include various input/output devices, e.g., a keyboard, a mouse, a display, a printer, etc. Furthermore, the computing device can include one or more non-volatile storage devices, such as a hard disc drive (HDD), optical (compact disc/digital video disc) drive, tape drive, etc. Generally speaking, any data processed by computing device 100 can be stored in memory 102, and can also be committed to non-volatile storage. As used herein, the term "computer-readable media" can include transitory and non-transitory instructions. In contrast, the term "computer-readable storage media" excludes transitory instances, and includes volatile or non-volatile storage devices such as random access memory, optical disks, hard drives, flash drives, etc.

Memory 102 of computing device 100 can include various components that implement certain processing described herein. For example, memory 102 can include a modeling component 103. Modeling component 103 can include subcomponents such as a model creating component 104, model training component 105, model testing component 106, and/or a model validation component 107. Model creating component 104 can be configured to create a model structure that can be used to train a language prior model. The language prior model can be used to generate lexical structures such as sentences. The model structure can be based on the order of words in the sentences, as discussed in more detail below.

Model training component 105 can be configured to train the language prior model using training data 108. Training data 108 can include training sentences 109 and a corresponding training lexicon 110. For example, training sentences 109 can include various unlabeled sentences in one or more corpora of documents written by humans. Generally speaking, training data 108 can encompass a broad range of documents, e.g., emails, text messages, encyclopedias, fiction, nonfiction, news, etc.

In other implementations, training sentences 109 can be selected so that the language prior model is tuned to the particular application, e.g., using only sentences from news stories to generate a language prior model that will be used for translating or disambiguating news stories, etc. Training lexicon 110 can include all of the words included in training sentences 109, and/or a subset of the words that occur in training sentences 109. For example, training lexicon 110 can include the highest frequency words in sentences 109, e.g., the top 3000 words, etc. Training lexicon 110 can also be unlabeled.

Model testing component 106 can be configured to test the language prior model using test data 111. Test data 111 can include test sentences 112 and a test lexicon 113. Generally speaking, test sentences 112 can be similar to training sentences 109, and test lexicon 113 can be similar to training lexicon 110. Moreover, test data 111 and training data 108 can, in some implementations, be obtained from the same corpus or corpora. In further implementations, test lexicon 113 can be a subset of training lexicon 110.

As mentioned above, model creating component 104 can be configured to generate a "language prior" model. For example, the language prior model can be used as a component by other types of models. In one particular implementation, the language prior model can be used as part of a machine translation model. As suggested above, the language prior model is not necessarily tuned to solve any single problem. Moreover, the language prior model can be used in a variety of Natural Language Processing (NLP) contexts. For example, as discussed in more detail below, the language prior model can be used for disambiguation purposes, among others.

As also explained in more detail below, the language prior model can have certain properties that may be useful in particular implementations. For example, the language prior model can be trained using unlabeled training data. This can be useful because, in comparison to unlabeled data, labeled training data may be relatively expensive and/or difficult to obtain. Instead of using labeled training data to develop a model that reflects the meanings of words in the training data, the language prior model can be viewed as using sentence structure to derive the meanings of the words. Because human users have constructed the sentences and decided how to arrange the words in the sentences, the placement of the words in sentences provides some information about the meanings of the words even though the words or sentences themselves may not have been explicitly labeled by human users.

In some implementations, the language prior model can be hierarchical. In the examples shown herein, the language prior is used to map words to sentences. However, the language prior model can be used at different levels of granularity. For example, the language prior model can be used to map sentences to paragraphs, paragraphs to documents, etc. The language prior model can also model the order of words in a sentence, order of sentences in a paragraph, order of paragraphs in a document or section thereof, etc.

For the purposes of this document, the term "lexical structure" is used to refer to a group of one or more "lexical units." Thus, a word can be viewed as a lexical structure having one or more letters or characters as lexical units of the lexical structure. When used in a sentence, however, the word can be viewed as a lexical unit of the lexical structure, i.e., the sentence. Similarly, a sentence can be a lexical unit of a lexical structure such as a paragraph or document, a paragraph can be a lexical unit of a document or document section, etc. For explanatory purposes, the examples discussed herein generally use sentences as lexical structures and words as lexical units. The concepts disclosed herein, however, are readily extendable to other types of lexical structures and lexical units. For example, in some implementations, the lexical units can include n-grams instead of, or in addition to, complete words. In another implementation, the lexical units are phrases and/or complete sentences, and the lexical structures are paragraphs and/or complete or partial documents.

In some implementations, the language prior model can include parameterized representations of the words in training lexicon 110. For example, each word in training lexicon 110 can be mapped to individual vectors, e.g., a group of floating point numbers or "word weights." More generally, the term "lexical unit weights" is used herein to refer to weights assigned to lexical units such as words, n-grams, sentences, paragraphs, etc. For each word, there may be n floating point numbers in the vector of word weights ("word vector") that represent the meaning of the word. Generally speaking, two words with very similar meanings (e.g., synonyms) can have relatively "close" word vectors when evaluated using a distance metric, e.g., Euclidean distance. Note, however, that two words with very different meanings (e.g., antonyms) can also have relatively "close" word vectors when evaluated using the distance metric. This is because antonyms are often used in similar linguistic contexts. For example, the words "love" and "hate" have very different meanings, but tend to have similar placement in sentences, e.g., "I love football" and "I hate football." Both words appear between the words "I" and "football," and thus may tend to have relatively close word vectors. The vector space of the word vectors is denoted herein as $\mathcal{R}^n$.

In some implementations, training sentences 109 (or other lexical structures such as paragraphs, etc.) can also be mapped to parameterized representations. For example, each sentence can be mapped to an m-dimensional sentence vector of m floating-point numbers, referred to herein as sentence weights. More generally, the term "lexical structure weights" is used to refer to weights assigned to lexical structures including phrases, sentences, paragraphs, documents, etc. In some implementations, m can be larger than n. For example, reasonable values of m and n may be 500 and 100, respectively. These vector sizes may provide a sufficiently accurate model without requiring undue computational effort. Generally speaking, the language prior model is trained on training sentences 109 using sentence vectors that each map to an individual training sentence. As discussed in more detail below, the language prior model can generally be trained by adjusting the sentence vectors and the word vectors, e.g., in an iterative, alternating fashion or using batch training techniques.

The language prior model can also be "generative," e.g., used to generate sentences. For example, given a sentence vector in $\mathcal{R}^m$, the language prior model can generate a corresponding sentence. In some cases, the sentences may be ungrammatical. However, given an appropriate sentence vector, the language prior model may be able to generate a corresponding grammatical sentence using the word vectors. As discussed in more detail below, model testing component 106 can test the language prior model by inputting sentence vectors to the language prior model to generate a sentence output. Generally speaking, one way to test the language prior model is to compare the sentence output to determine whether the sentence output by the language prior model matches an expected sentence. In one specific implementation, pairs of translated sentences in two different languages are used for testing purposes.

Example Model Structure

Figure 2:
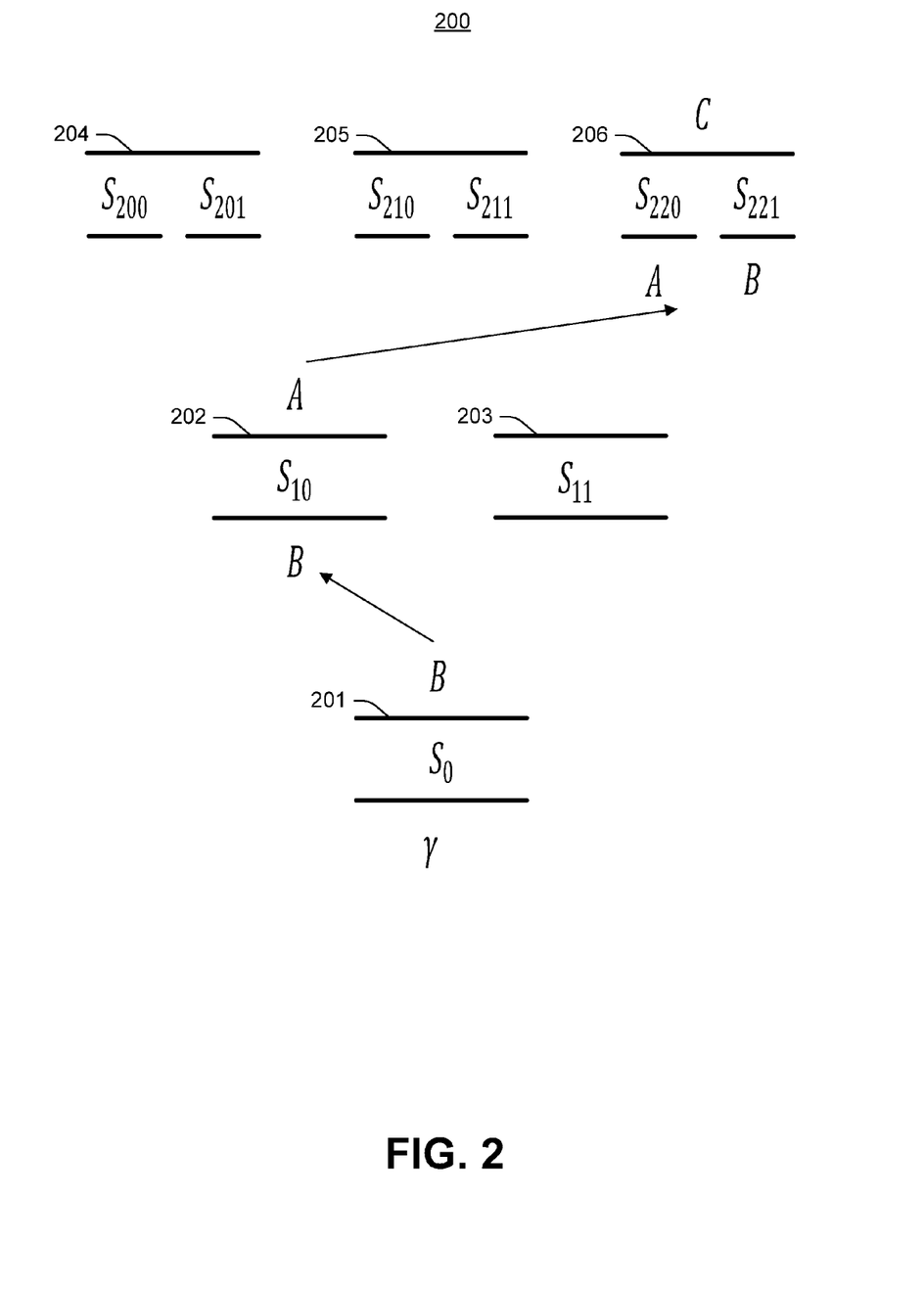
FIGS. 2-4 and 8 show exemplary models that can be provided in accordance with some implementations of the present concepts.

FIG. 2 illustrates an exemplary model structure 200 that can be created by model creating component 104. Generally speaking, model structure 200 can be viewed as a set of submodels that can perform operations that are, in some ways, analogous to those of neural networks. Thus, for the purposes of this discussion, each submodel is referred to as a "net." However, note that the submodels can generally be any adaptive model, e.g., models having parameters that can be learned using gradient descent using a gradient of an objective function with respect to outputs of the submodels. Model structure 200 is illustrated with six nets, 201, 202, 203, 204, 205, and 206. As discussed in more detail below, each net can have one or more inputs and/or one or more outputs.

For purposes of organization, model structure 200 can be viewed as having three layers—a first or "0 index" layer including net 201, a second or "1 index" layer having nets 202 and 203, and a third or "2 index" layer having nets 204, 205, and 206. Note that, more generally, this document adopts a "0-indexed" convention when referencing indices.

Generally speaking, during training, each layer can be trained to output an assigned word using a training sentence vector that is input to the 0 index layer. To determine which word is assigned to be output by a particular layer, the individual words of training lexicon 110 can be ordered by inverse frequency in constructing model structure 200. The 0 index layer can have the lowest-frequency word, the 1 index layer the next lowest-frequency word, and so on. Lexicographic ordering can be used to break ties.

Thus, given the training sentence ABC, the words may appear in increasing frequency in training lexicon 100 in the order BAC. In other words, "B" is the least-frequently used word, then "A," and finally "C" is the most-frequently used word out of the three words. Accordingly, during training for this particular sentence, the 0 index layer of the model structure is assigned to output the word "B," the 1 index layer of the model structure is assigned to output the word "A," and the 2 index layer is assigned to output the word "C." As discussed in more detail below, ordering the layers based on inverse frequency of the words can be used to speed computation relative to other possible ordering schemes, e.g., during a test phase described in more detail below.

Also, note that the discussion herein uses a particular arrangement for the nets for illustrative purposes. However, generally speaking, various models can be used to implement the techniques discussed herein. In particular, other models that can learn a mapping from a vector space $\mathcal{R}^a$ to another vector space $\mathcal{R}^b$ can be used, e.g., models suitable for training using gradient descent, etc. As but two examples, multilayer neural nets as well as boosted trees may also be suitable for implementing the techniques discussed herein.

As shown in FIG. 2, model structure 200 can be used to model lexical structures (e.g., sentences) of length up to three units (e.g. words). More generally, model structures can be built using the disclosed techniques by using a layer for each unit of length of the lexical structure that is being modeled.

Note that, when modeling sentences, a lexical unit can also be an n-gram instead of a word. When modeling a paragraph, a lexical unit can be a sentence. When modeling a document, a lexical unit can be a paragraph. For the purposes of illustration, model structure 200 shows a sentence as a lexical structure that is modeled using words as individual lexical units. In particular, the sentence "ABC" including individual words "A," "B," and "C" can be modeled as discussed in this example.

As mentioned above, the individual words of the sentence can have corresponding vectors of size n. The corresponding word vectors can be used in operations via one or more paths through nets. γ can represent a "default word vector" that can be "fixed" in that γ can have the same value for every sentence across each training iteration. Note, though, that in some implementations γ can change during training of the language prior model.

$S_i$, $S_{ij}$ and $S_{ijk}$ can represent sentence matrices that are used when training the language prior model using model structure 200. Each matrix element in $S_i$, $S_{ij}$ and $S_{ijk}$ can be chosen from a given set of shared weights in $\mathcal{R}^m$ (recall that m is not necessarily equal to n). Generally speaking, sentence matrices $S_i$, $S_{ij}$ and $S_{ijk}$ can be individual matrices of size N×N that are, in some implementations, sparse matrices. Each weight in the sentence vector of length M can appear in any of the matrices and any number of times.

The individual sentence matrices have indexes that identify them as follows. The first (leftmost) index represents the layer in which each sentence matrix applied. Thus, the sentence matrix for net 201 has a first index of "0" because this net appears in the first or "0" layer, the sentence matrices for nets 202 and 203 have first indices of "1" because these nets appear in the second or "1" layer, and the sentence matrices for nets 204, 205, and 206 have first indices of "2" because these nets appear in the third or "2" layer.

The second, middle index identifies the net within the particular layer, reading from left to right. Thus, the sentence matrix for net 202 has a second index of "0" indicating that this is the first or leftmost net in the layer. Likewise, the sentence matrix for net 203 has a second index of 1, and the sentence weights for nets 204, 205, and 206 have second indices of 0, 1, and 2, respectively. Note that net 201 is not shown with a second (or third) index because net 201 can be uniquely identified with just the first index as there is only one net in layer 0.

The third, rightmost index identifies the particular input to which that the sentence matrix is applied. Thus, considering net 206, sentence matrix S220 is applied to the leftmost input and sentence matrix S221 is applied to the rightmost input. Note that nets 201, 202, and 203 have one input each and accordingly each input for these nets can be uniquely identified without a third index.

As mentioned above, the sentence matrices in the nets can include one or more weights taken from a sentence vector of length M. In some instances, a given weight can appear in several different matrices. For example, matrices S0 and S220 can each include the first weight in the sentence vector. The weight can appear only once in matrix S0, and can appear multiple times in matrix S220. The second weight in the sentence vector may not appear in any of the matrices. A third weight in the sentence vector could appear multiple times in one matrix, e.g., S11, and not appear in any other matrix. Exemplary techniques for populating the sentence matrices with sentence weights are discussed in more detail below.

The horizontal line segments shown in each net generally correspond to individual word vectors in $\mathcal{R}^n$. In the first and second layers (indices 0 and 1), each net corresponds to a linear mapping from $\mathcal{R}^n$ to $\mathcal{R}^n$. This is because each net receives one or more input word vectors of length N, each of which can be multiplied by an individual sentence matrix in that net. The output of the net is a vector of length N that represents the sum of the products of the input vectors and the sentence matrices.

Note that the mapping can also be nonlinear, but the linear case is described herein. The "0" index or first layer and the "1" index or second layer map from input vectors in $\mathcal{R}^n$ to output vectors in $\mathcal{R}^n$. In the third layer (index 2), each net is a linear mapping from an input vector in $\mathcal{R}^{2n}$ (or two concatenated vectors of length N) to an output vector $\mathcal{R}^n$, the fourth layer (index 3) maps from $\mathcal{R}^{3n}$ to $\mathcal{R}^n$, and so on. Thus, representing the number of layers by L (where the example of FIG. 2 has L=3), the total number of nets for a language prior model with L layers can be ½L(L+1). As mentioned above, to model sentences with up to L words (or n-grams), model structure 200 can use L layers. The words represented by the language prior model can be drawn from training lexicon 110.

Each net in model structure 200 can have one or more inputs and/or one or more outputs. Generally speaking, the input to each net can be one or more word vectors of length N. For the purposes of this example, a single path though model structure 200 is represented by the arrows shown in FIG. 2. Along this path, the default word vector γ is an input to net 201, the output of net 201 is used to determine the input to net 202, and the outputs of nets 201 and 202 are used to determine the inputs to net 206.

As discussed in more detail below, individual nets in model structure 200 can have assigned words from the training sentence. After training, given the sentence vector for the word ABC, each net can output a vector that is relatively close to the vector for its assigned word. As shown in FIG. 2, for net 201, the assigned word is B, for net 202, the assigned word is A, and for net 206, the assigned word is C. Generally speaking, the language prior model can be trained iteratively so that the actual output of each net along the path becomes closer to the word vector for its assigned output. In other words, the language prior model can be trained using model structure 200 such that the output of net 201 becomes closer to the word vector for the word B, the output of net 202 becomes closer the word vector for the word "A," and the output of net 206 becomes closer to the word vector for the word "C."

The direction taken from the output of each net can be indicative of the relative location of each word in the sentence. Generally speaking, if the next word in the sentence is to the left of a previous word, the path goes to the left. In the sentence "ABC," the word "A" is to the left of the word "B." Accordingly, the path taken from net 201 goes to net 202 to produce the phrase "AB." Likewise, since "C" occurs to the right of both "A" and "B" in the sentence, the path taken from net 202 goes to net 206.

Figure 3:
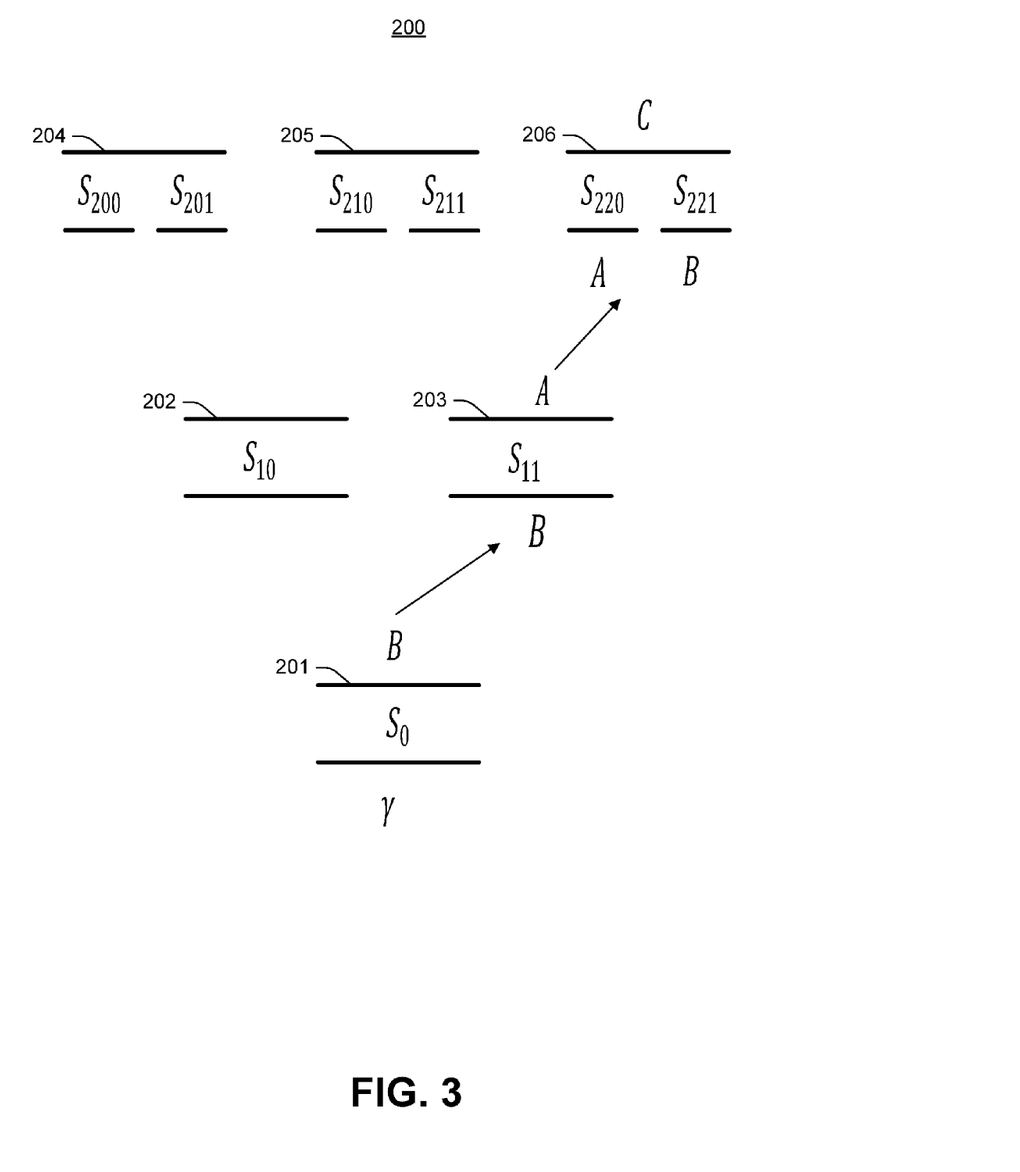

A few other examples may be useful to further illustrate how paths through model structure 200 can be mapped to particular sentences. As another example, FIG. 3 illustrates model structure 200 in a configuration to model the sentence "BAC." Now, the word "A" is to the right of the word "B" in the sentence. Thus, the path from net 201 goes to net 203 instead of net 202, and the path from net 203 goes to net 206.

Figure 4:
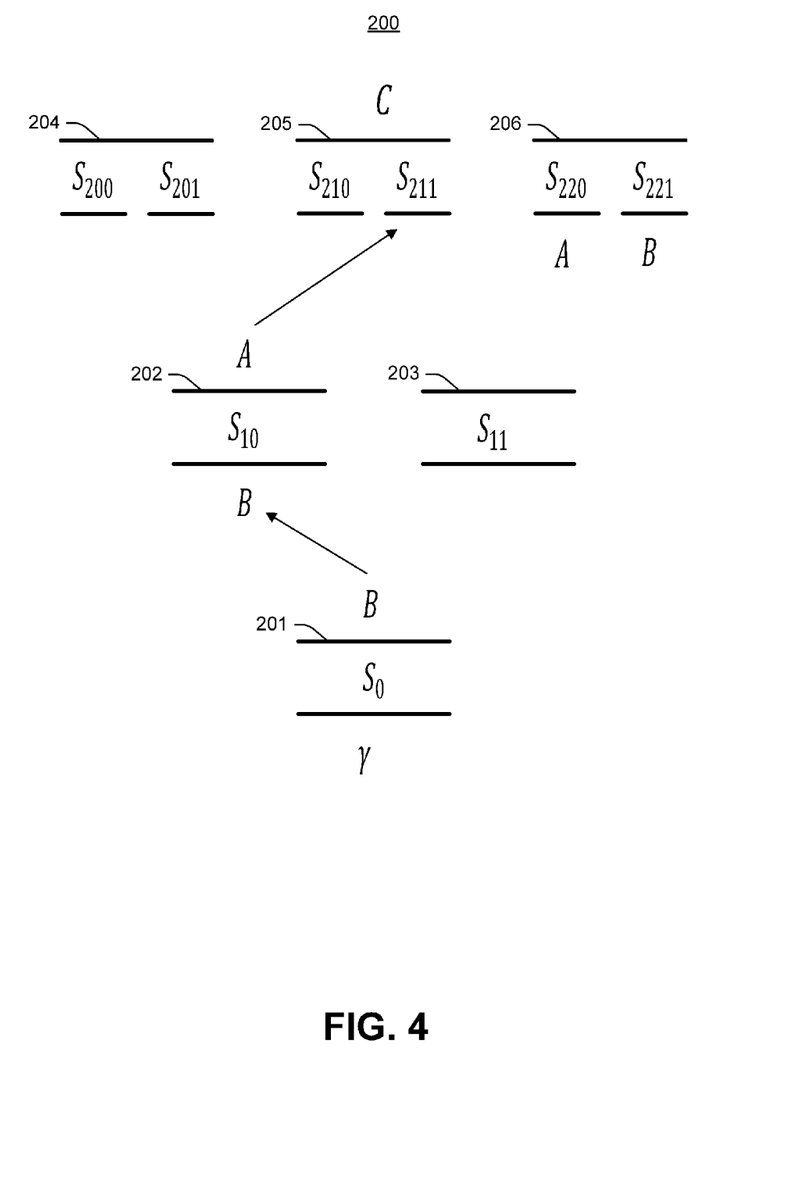

As another example, consider the sentence "ACB," illustrated in FIG. 4. Here, the word "A" is still to the left of the word "B," so the output of net 201 is still used as the input to net 202. However, the word "C" is to the right of the word "A" and to the left of the word "B." Thus, here, the path from net 202 goes to net 205 instead of net 206. In other words, net 205, the middle net in the layer, is used for words that are between input words from previous layers. Note also that, for the sentence "CAB," the path from net 202 goes to net 204 (not shown).

In each net, the input word vectors can be used in one or more mathematical operations to produce corresponding output vectors. Referring back to FIG. 2, for example, in net 201, the default word vector γ can be multiplied by $S_0$ to produce an output. Net 201 is assigned word vector for B, so during training the output of net 201 can become relatively closer to the word vector for the word "B." The output of net 201 can become relatively closer to the word vector for the word "B" by (1) changing the sentence weights or (2) changing the word vectors.

The word vector for the word "B" (which is not necessarily the output of net 201) can be used as an input to net 202. In net 202, the word vector for the word "B" is multiplied by $S_{10}$ to produce an output of net 202. The language prior model is trained so that the output of net 202 becomes relatively closer to the word vector for "A." Generally speaking, this can happen for one of two reasons. One way is by adjusting the weights in the sentence vector. When a given weight in the sentence vector is adjusted, any sentence matrix with an occurrence of that weight is affected. Another way the output of a net can become closer to the assigned word vector is to adjust the word vectors themselves to become relatively closer to the outputs. When the training is complete, the language prior model includes adjusted word vectors for each of the words in training lexicon 110.

Continuing from the example above, the word vectors for the words "A" and "B" can be used as inputs to net 206. The word vector for "A" can be multiplied by S220 and summed with the product of the word vector for "B" and S221. The sum of these two products can be trained to become relatively closer to the word vector for "C."

In the disclosed implementations, each net can be a linear mapping. Thus, for example, for the first net 201, its output can be represented as:

$$S_0 \gamma \in \mathcal{R}^n.$$

where $S_0$ is an n by n matrix. As another example, the output of net 206 can be represented as:

$$S_{220}A + S_{221}B \in \mathcal{R}^n.$$

where $S_{220}$ and $S_{221}$ are both n by n matrices. In general, the inputs to any net will be word vectors that are a subset of the word vectors corresponding to the words that make up the sentence, where those inputs occur in the same order as the words appear in the sentence. Thus for example in FIG. 4, the nets labeled 202 and 203 both take the word vector for word B as input, and the nets labeled 204, 205 and 206 all take the word vectors for the words A and B as their inputs.

Example Method for Creating Model Structure

Figure 5:
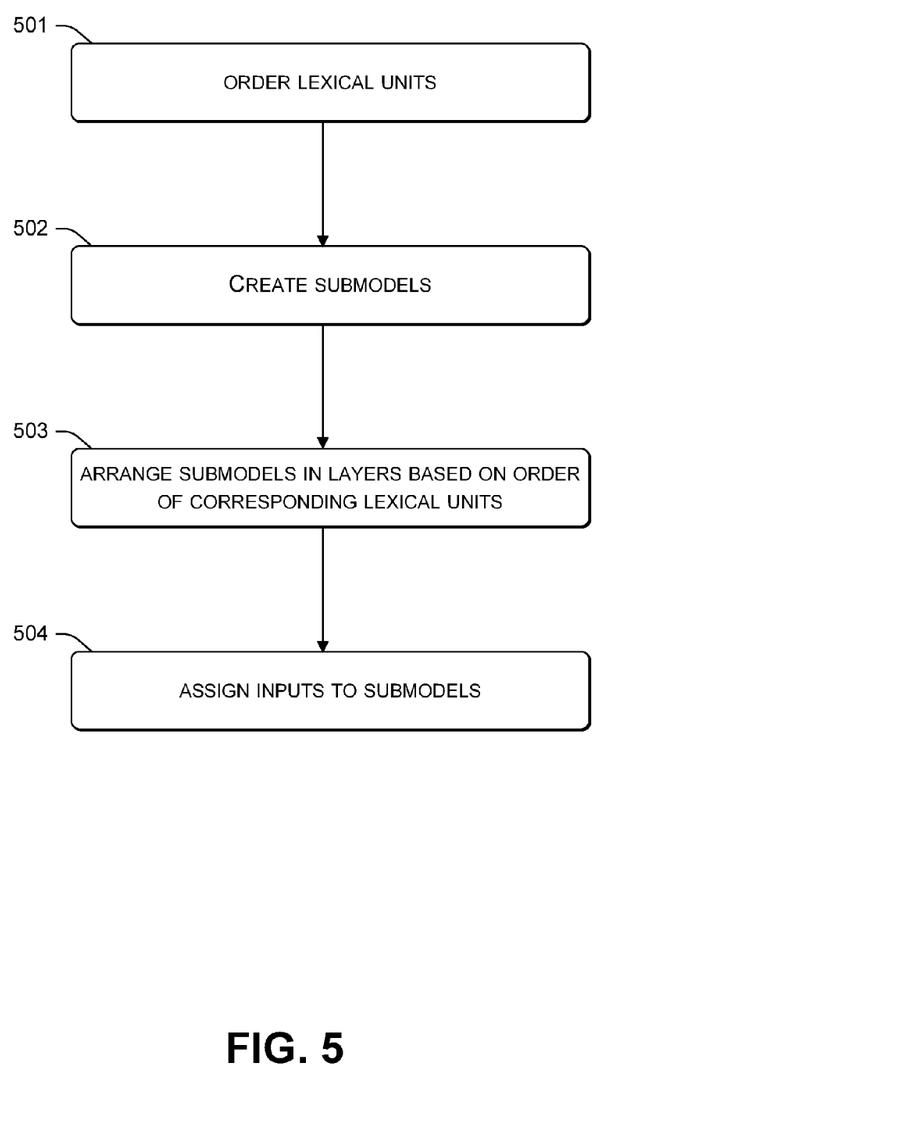
FIGS. 5-7 show flowcharts of methods in accordance with some implementations of the present concepts.

FIG. 5 illustrates an exemplary method 500 that is suitable for implementation on computing device 100 or by other devices or systems. For example, model creating component 104 can perform part or all of method 500. Generally speaking, method 500 relates to creating a model structure for processing a lexical structure that includes one or more lexical units. Method 500 illustrates how model structure 200 can be created for a single lexical structure, e.g., the sentence "ABC." Training of the language prior model with multiple lexical structures will be discussed afterwards.

Lexical units can be ordered at block 501. For example, words from training lexicon 110 can be ordered in inverse frequency of their occurrences in training sentences 109. The words can also be ordered according to other secondary criteria, e.g., alphabetically, etc.

Submodels are created at block 502. For example, the submodels can be one or more nets that can be trained to output vectors for lexical units such as words. The submodels can include matrices that include one or more weights from a vector of weights for a lexical structure such as a sentence. For example, as shown in FIG. 2, each submodel can include one or more matrices that include weights taken from the sentence vector for the sentence "ABC."

The submodels are arranged in layers at block 503. For example, the number of layers can correspond to the length of the lexical structure. The layers can be ordered based on the corresponding order of the lexical units. In the case of FIG. 2, the inverse frequency order of the words is "BAC," so the layers are ordered as follows: "B" is assigned to be output by the 0-index layer, "A" is assigned to be output by the 1-index layer, and "C" is assigned to be output by the 2-index layer.

Inputs can be assigned to the submodels at block 504. For example, the word vector assigned to net 201 in layer 0 can be assigned as a single input to either net 202 or 203 of layer 1. The assigned word vectors for nets 201 and 202 (or 203) can be used as inputs to any of nets 204, 205, and/or 206 in layer 2. Note that assigning the inputs in this manner also defines a path through model structure 200, and, accordingly, the operations that are performed by the model structure during training. Here, for example, the word vector for the word "B" is assigned as an input to net 202 and the word vectors for the words "A" and "B" are assigned as inputs to net 206. Note that, because of the order of the words "A," "B," and "C" in the sentence, nets 203, 204, and 205 are not on the path and are not assigned any inputs.

Training

The following discussion describes training techniques that can be used to train the language prior model using model structure 200 shown in FIG. 2. For example, the techniques can be applied by model training component 105. Given the sentence "ABC" where "A", "B", and "C" are each individual words or n-grams of the sentence, the language prior model can be adjusted so that a suitable choice of sentence weights for the sentence vector will result in model structure 200 outputting the sentence "ABC."

When training the language prior model with the sentence "ABC," the training generally is such that the output of net 201 becomes closer to the word vector for "B," the output of net 202 becomes closer to the word vector for "A," and the output of net 206 becomes closer to the word vector for "C." This can be written as:

$$\text{minimize } \tfrac{1}{2}((B-S_0\gamma)^2+(A-S_{10}B)^2+(C-S_{220}A-S_{221}B)^2)$$

$$\text{subject to } \|A\|^2=\|B\|^2=\|C\|^2=\|\gamma\|^2=1.$$

Note that the "subject to" constraints can avoid a trivial solution where all of the weights in the sentence vector are zero and thus each sentence matrix $S_{xxx}$ is also all zero. Thus, consider an example where training sentences 109 include one sentence—"ABC." Training can proceed as follows. As mentioned above, training lexicon 110 can include words that are ordered first by frequency and then alphabetically. The words can be presented to model structure 200 in different orders, e.g., the order is "BAC" for the example discussed herein. The ordering then determines which nets are used. In other words, the ordering determines the path that is taken through the hierarchy of nets.

In this case, the sentence is "ABC," so the first net (net 201) is trained to output "B," because it has lowest frequency and is therefore first in the inverse-frequency order. The next net to use is net 202, because the next word to output is "A" (because it has the next lowest frequency) and because in the sentence being modeled ("ABC"), "A" occurs to the left of "B." Thus, the ordering of the words in training lexicon 110 by (1) frequency and (2) lexicographically works together with the ordering of the words in the sentence to uniquely determine which nets to use. Equivalently, the ordering in the lexicon and in the sentence, taken together, determine the path through the hierarchy of nets.

Exemplary Training Method

Figure 6:
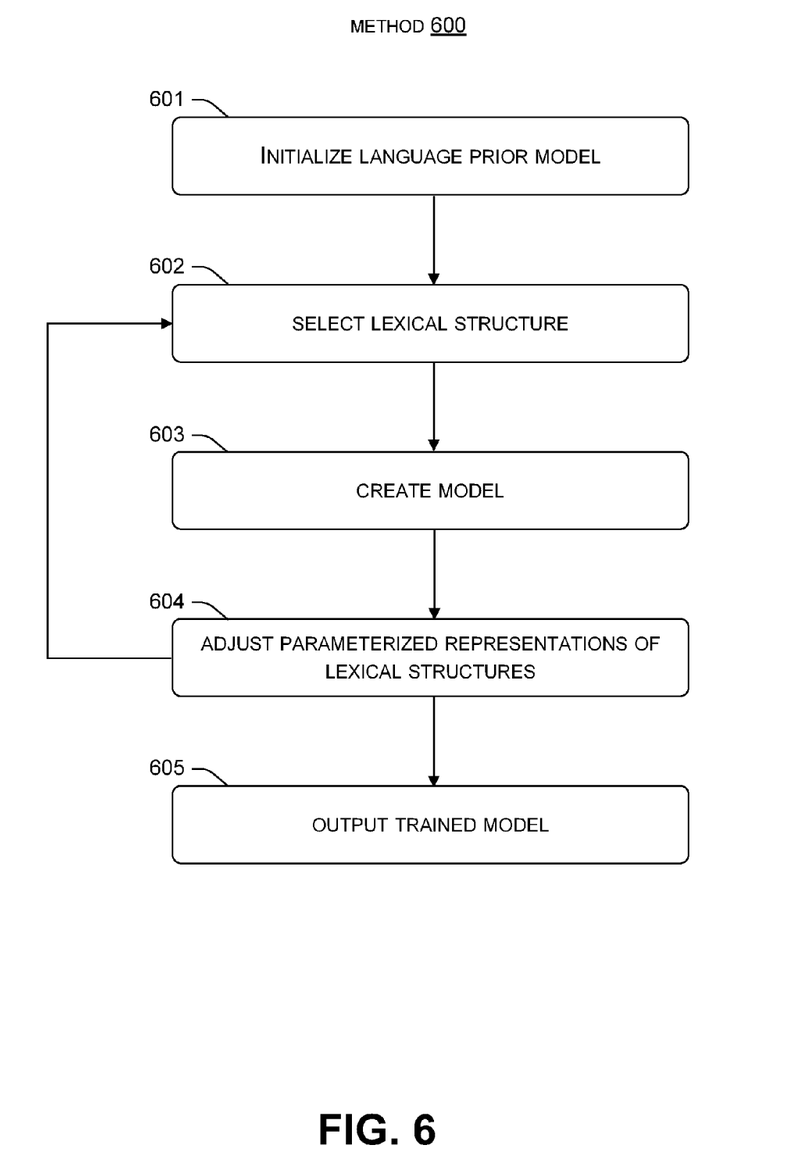

FIG. 6 illustrates an exemplary method 600 that is suitable for implementation on computing device 100 or by other devices or systems. For example, part or all of method 600 can be performed by model training component 105. Generally speaking, method 600 relates to training a language prior model using a plurality of training sentences 109.

The first example set forth below describes training the language prior model with multiple sentences taken from training sentences 109. A second example of applying method 600 follows the first example, and shows how a specific learning algorithm can be applied to implement method 600.

The language prior model is initialized at block 601. For example, the word vectors and/or sentence vectors can be initialized to default values, e.g., all 0 values, etc.

A lexical structure is selected at block 602. For example, model training component 105 can access training data 108 and select the sentence "ABC" from training sentences 109. In some implementations, accessing training data can involve loading training data from a disk or other permanent storage into memory 102.

Next, a model structure is created at block 603, e.g., using method 500 discussed above. For example, model creating component 104 can create model structure 200 and determine a path through the model structure as mentioned above, e.g., by assigning outputs to one or more of the nets. For the purposes of this example (FIG. 2), model creating component 104 can assign the word "B" to net 201, the word "A" to net 202, and the word "C" to net 206. The nets can be layered based on various permutations of the words in the sentence. For example, as mentioned above, these nets can be layered based on the order of the inverse frequency of the words in training lexicon 110. Thus, the path through model structure 200 is based on both (1) a selected permutation of the words in the training sentence (e.g., which word is output by each layer) and (2) the order in which the words appear in the training sentence (e.g., the direction taken from lower-level nets to higher level-nets).

Next, parameterized representations of the lexical units can be adjusted at block 604. For example, the word vectors for the individual words in the training sentence can be adjusted so that the output of the individual nets is closer to their assigned outputs. In an ideal case, the word vectors can be adjusted so that the output of net 201 is equal to the word vector for the word "B," the output of net 202 equals the word vector for the word "A," and the output of net 206 equals the word vector for the word "C." However, training can generally proceed to reduce the squared error of the output of each net relative to the vector for its assigned output word. Further, as mentioned in more detail below, block 604 can include adjusting parameterized representations of the lexical structure as well, e.g., the sentence weight vectors for each sentence in training sentences 109.

Next, the language prior model is output at block 605. For example, the language prior model can be output as a collection of word vectors for use in one or more other applications as discussed in more detail below. Note that, in some implementations, blocks 602-604 are repeated numerous times before the language prior model is output, e.g., one or more times for training sentences 109. Alternatively, thresholding or optimization schemes can be applied to determine whether more adjustments are be made to the individual word vectors, or the language prior model is ready to be output without further training.

A Specific Training Example

The following discussion shows how a specific training algorithm can be used to implement method 600. The following discussion follows each block of method 600 using a stochastic gradient descent learning algorithm to train a language prior model.

At block 601, the language prior model is initialized. For example, model training component 105 can perform the following. First, training sentences 109 can be loaded into memory 102. Next, the word vectors for the words in training lexicon 110 can be initialized by adding together character vectors for each word, randomly, or by other methods. In some implementations, the character vectors are fixed, random vectors assigned to each character. The mean and unit norm can be subtracted from the vectors for each word. Generally speaking, this technique can cause individual words that are similar on a character-by-character basis to have similar initialized word vectors. Many other possible initialization techniques could be used.

For each word vector, an associated incremented gradient vector can also be initialized to zero. A sentence counter can be set to one, e.g., $\alpha=1$. A number of epochs or passes through the training sentences E can be defined and set to 1, e.g., $e=1$. The initial word vector for each word can then be normalized by subtracting the mean of all word vectors, and then rescaling each vector to a length of one.

At block 602, a training sentence (lexical structure) is selected for training. For example, an individual sentence from training sentences 109 can be selected for input to model structure 200. For a sentence $\Sigma_\alpha$ (of length $l_\alpha$), if the sentence counter $\alpha=N+1$, then the epoch counter can be incremented, $e \rightarrow e+1$ and the sentence counter can be reset, $\alpha=1$. If the epoch counter exceeds the number of epochs, $e=E+1$, then method 600 can stop.

At block 603, the model structure is created and a path through the model structure is determined. For example, using the order of the words in $\Sigma_\alpha$, together with the order of the words in the lexicon, model training component 105 can compute which nets to use (i.e. the path).

At block 604, the parameterized representations of the lexical units (e.g., the word vectors) can be adjusted. For example, model training component 105 can compute a derivative using an objective function:

$$C = \Sigma_{i=0}^{l_\alpha - 1} \|w_{\alpha(i+1)} - S_\alpha[w_{\alpha i}]\|^2,$$

with respect to the word parameters for each word $w_{\alpha i}$ in the $\alpha$th sentence. Here, $[w_{\alpha i}]$ denotes the collection of words that are used as inputs to net $S_\alpha$, where the symbol $S_\alpha$ is used to denote the matrix of sentence weights for that net. The gradient can be incremented for each word appearing in sentence $\Sigma_\alpha$. Model training component 105 can also find values for the sentence weights $S_\alpha$ (e.g., optimal values) using an Ordinary Least Squares algorithm. Model training component 105 can do so by minimizing an objective function derivative C with respect to the sentence weights $S_\alpha$, keeping the word vectors w fixed to their current values.

Next, the word vectors can be incremented as part of block 604. For example, model training component 105 can increment, for each component i, $w_{\alpha i} \rightarrow w_{\alpha i} - \lambda g_{\alpha i}$, where $g_{\alpha i}$ is the incremented gradient computed above. Then, model training component 105 can set $g_{\alpha i}=0 \; \forall i$.

The word vectors can also be normalized and rescaled. For example, if $e_i=E$, model training component 105 can normalize each word vector by subtracting the mean of all words vectors, and can rescale each word vector to length one.

If all training sentences and epochs have been completed, method 600 can move to block 605 and output the trained language prior model. Otherwise, method 600 can return to block 602.

In the above second example, the word vectors are incremented after each sentence, e.g., a stochastic gradient descent. Alternative training schemes can also be used to implement method 600, such as batch learning, conjugate gradient descent, etc.

Objective Function

If $S_\alpha$ is the $\alpha^{th}$ sentence matrix and $w_{\alpha i}$ is the $i^{th}$ word in that sentence (so that $w_{\alpha 0}$ is the root word for all a), then the objective function can be written:

$$F := \frac{1}{2N} \sum_{\alpha=1}^{N} \sum_{i=0}^{n_\alpha - 1} \|w_{\alpha(i+1)} - S_{\alpha i}[w_{\alpha i}]\|^2$$

where $[W_{\alpha i}]$ denotes the words that are inputs to the ith net for the $\alpha$th sentence, N denotes the number of sentences, $n_\alpha$ denotes the number of words in the $\alpha$th sentence, $w_{\alpha i}$ is the ith word in the $\alpha$th sentence, and $S_{\alpha i}$ is the matrix of sentence weights for the ith submodel for the $\alpha$th sentence.

Now for the sentence ABC and fixed $S_{ijk}$, the objective function can be written (omitting the factor of ½) as:

$$[\gamma' \; B' \; A' \; C'] \begin{bmatrix} S_0'S_0 & -S_0' & 0 & 0 \\ -S_0' & \mathbb{1}+S_{10}'S_{10}+S_{221}'S_{221} & -S_{10}'+S_{221}'S_{220} & -S_{221}' \\ 0 & -S_{10}'+S_{221}'S_{220} & \mathbb{1}+S_{220}'S_{220} & -S_{220}' \\ 0 & -S_{221}' & -S_{220}' & \mathbb{1} \end{bmatrix} \begin{bmatrix} \gamma \\ B \\ A \\ C \end{bmatrix} :=$$

$$W' \overset{-1}{\underset{S}{\Sigma}} W$$

(where $W':=[\gamma' \; B' \; A' \; C']$), or equivalently as $$(S-\mu)' \Sigma_W^{-1}(S-\mu)$$

where S collects the S weights into a vector (of length at most the number of shared weights), and where μ is chosen such that:

$$\mu' \Sigma_W^{-1} \mu = \|A\|^2 + \|B\|^2 + \|C\|^2 = 3.$$

The optimization problem can be solved, e.g., at block 604 of method 600, by alternating between (1) fixing the sentence weights S and maximizing the posterior of the $\mathcal{N}(0, \Sigma_S)$ Gaussian:

$$p(W|\Sigma_S)$$

(subject to $\|W_i\|=1$), and (2) fixing the word weights W and maximizing the posterior of the $\mathcal{N}(\mu, \Sigma_W)$ Gaussian $$p(S|\Sigma_W)$$

(with no constraints on S).

In such implementations, each path through model structure 200 can correspond to a pair of Gaussians, in which the parameters of each Gaussian become the variables of the other. For batch training, the sentence weights S can be chosen for the entire set of training data, e.g., training sentences 109 and/or test sentences 112. One set of sentence weights S can be chosen per sentence, and the gradients for each weight in the word vectors W can be computed and incremented. The word vectors W can then be updated, and the process repeated, where the sentence weights S are recomputed to update the vectors for each sentence.

For fixed word vectors W, the sentence weights S for any given sentence can be found in a single step, since they solve a least square regression with a small number of parameters. For example, the sentence weights can be solved using Cholesky decomposition. For fixed sentence weights, the word vectors can be adjusted using gradient descent, e.g., in implementations where there are too many individual elements of the word vectors to solve using the Cholesky decomposition.

As shown above, in stochastic gradient descent, the word vectors W can be updated for each training sentence. Since the sentence weights may change slowly with each iteration, they can be computed once for each sentence during the first epoch, and only updated (for a given sentence) every few epochs. In other words, at least some epochs can be processed where the word vectors are updated but not the sentence vectors.

Lexical Structure Generation

Model structure 200 can be used to generate sentences or other lexical structures after training the language prior model. For example, model structure 200 can be given a sentence vector and used to generate a sentence.

Figure 7:
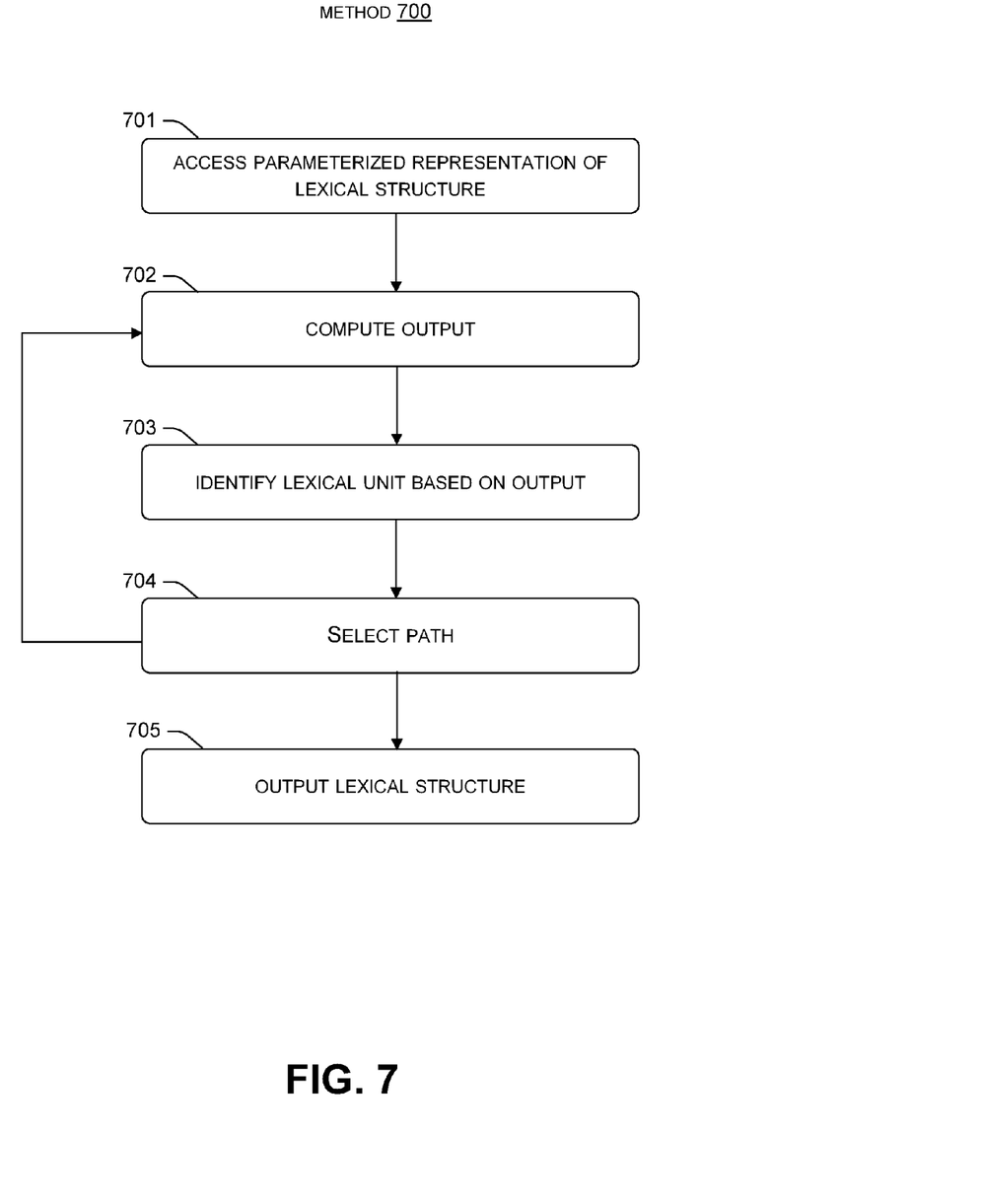

FIG. 7 illustrates an exemplary method 700 that is suitable for implementation on computing device 100 or by other devices or systems. For example, model testing component 106 can perform part or all of method 700 during a testing phase, or a separate lexical structure generating component can be provided as part of computing device 100. Generally speaking, method 700 relates to generating a lexical structure from a parameterized representation of the lexical structure. The following example uses FIG. 2 and shows how the sentence "ABC" can be generated from a sentence weight vector for this sentence.

A parameterized representation of a lexical structure can be accessed at block 701. For example, model testing component 106 can access a sentence weights vector for a corresponding sentence from test sentences 112. Each sentence matrix can be populated with the values for the individual sentence weights from the vector.

A submodel output can be computed at block 702. For example, model structure 200 can compute the output of the net in layer 0, e.g., net 201, by multiplying the default word vector by the populated sentence matrix S0.

A lexical unit can be identified based on the output at block 703. For example, the word $w_1$ in test lexicon 113 that is nearest (in the Euclidean sense) to the output of net 201 can be identified. If the language prior model is trained properly, then the output of net 201 can be a vector that is closer to the vector for the word "B" than to any other word vector. The corresponding word vector for the word "B" can be used as an input to the two nets in the next layer, e.g., nets 202 and 203.

Next, at block 704, a path can be selected based on the output of the previous nets. In the case of net 201, there is no previous net, so method 704 returns to block 702 and blocks 702 and 703 can be performed again, e.g., for the second layer. At block 702, the outputs of these two layers can be computed. At block 703, the word $w_{10}$ in test lexicon 113 that is closest to the output of the left net (e.g., net 202) can be identified. Similarly, the word $w_{11}$ that is closest to the output of the right net (e.g., net 203) can be identified. For the purposes of this example, the output of net 202 is closest to the word vector for "A" and the output of net 203 is closest to the word vector for "D."

A path is taken based on distance at block 704. For example, suppose that a distance d1 corresponds to going left from net 201 and a distance d2 corresponds to going right from net 201. If $d_1 < d_2$, the left net 202 is taken and otherwise the right net 203 is taken. If the left net is taken, then $w_1$ is to occur to the left of $w_0$ in the sentence being constructed. In this example, the output of net 202 is closer to the word vector for A than the output of net 203 is to the word vector for "D." Thus, the path to the left is taken.

Method 700 can be repeated for each layer to take a path to one of the nets in that layer. The net that is along the chosen path determines the location of the output word for that net. In other words, the word that is nearest to its output is located relative to the previously-identified words of the net based on the chosen path. Once a complete path has been taken through each layer of the language prior model, the generated lexical structure can be output at block 705.

Testing

In some implementations, e.g., by using a large enough pool from which to choose the sentence weights S, then the objective function can be made zero for any choice of the word weights W. This amounts to overfitting the data, and the resulting language prior model may not learn, e.g., the word vectors may remain at their initial values. In some cases, it is useful to train the language prior model to learn a representation of language that will be useful for many applications, rather than training the model to be fine-tuned to any particular application. One testing metric that can be used to test the trained model is the fractional reduction in the number of reconstruction errors of a separate test set of sentences, e.g., test sentences 112. If the initialized language prior model cannot reconstruct test sentences 112 before training but can do so after training, this may be an indicator that the language prior model has learned useful information about the language.

One way to test the trained language prior model is to compute the sentence with maximum posterior probability. As a first approximation, this can be performed using a nearest neighbor algorithm for each individual net's output. The next layer can be computed, and the net that gives the smallest Euclidean distance to a word in test lexicon 113 can be chosen. In this way, a sentence can be constructed. The sentence ends when a particular symbol is encountered, e.g., a sentence delimiter such as ".", "!" or "?" is encountered. In some implementations, a frequency is assigned to each such symbol that is the highest frequency encountered in the lexicon, plus one. This can ensure that such sentence-delimiting symbols are encountered only in the higher layer nets.

A more refined approximation than the above approach can be implemented as follows. For each net, model testing component 106 can compute the two nearest words. Then a graphing algorithm such as Djikstra can be applied to find the shortest path through the individual layers of model structure 200. Such a procedure can recover even if the $S_0$ net has the wrong top choice.

Other information can be used for testing purposes as well. For example, consider a reliable source of paraphrase data that identifies two sentences that are paraphrases of each other. Model testing component 106 can add the constraint that such pairs of sentences have small Euclidean distances between them. This comparison can be performed for each pair of such sentences.

Figure 8:
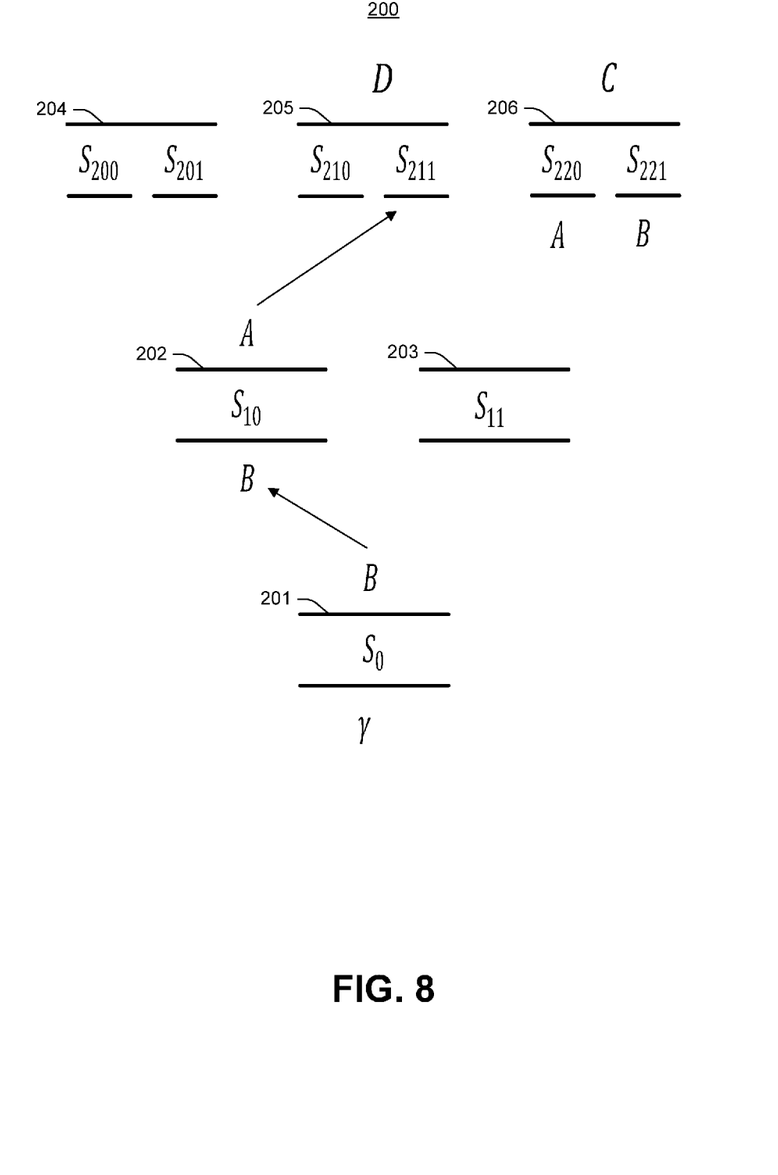

In some implementations, testing can be used to further refine the language prior model. For example, consider FIG.

8, which illustrates model structure 200 in a configuration where the model structure receives a sentence vector for "ABC" but incorrectly outputs the sentence "ADB." One way to refine the language prior model is to introduce a "repulsion term" that penalizes instances when the language prior model outputs the "wrong" word. In other words, the repulsion term is used for those instances where the output of a given net is closer to an incorrect word than to the expected word.

In some implementations, the repulsion term can be implemented as follows:

$$w \rightarrow w + \lambda \frac{s}{\|S\|}\left(1 - \frac{\|s\|}{d+m}\right)\theta\left(1 - \frac{\|s\|}{d+m}\right)$$

The repulsion term can move incorrect words away from their outputs. Here d is the distance from the correct word to its output, m is an added extra positive "margin," and theta is zero if its argument is negative, one otherwise. The repulsion drops off linearly as the incorrect word moves away from its output until it becomes zero for any distance which is greater than d+m.

Validation

As mentioned above, model validation component 107 can be configured to perform model validation, e.g., after training and testing. Validation data can used to set model 'metaparameters'—for example, the length of the word vectors, the length of the sentence weight vectors, submodel connectivity, etc.

Generally speaking, changes to individual metaparameters can have different effects on the language prior model. Increasing the length of the sentence weight vectors, for example, might allow the language prior model to more accurately reproduce sentences from sentence vectors, but may also result in learning less information via the word vectors. As another example, reducing the size of the word vectors might allow for training the language prior model more quickly, but these word vectors may carry less information relative to implementations with longer word vectors.

Computational Speedup

Note that arranging the words by inverse frequency can provide some degree of computational efficiency for testing purposes. This is generally true because each net will generally output a word that is at least as frequent as its most frequent input word. Thus, for example, if a net has an input word with frequency equal to 2, then the long tail of frequency 1 words need not be considered when computing the word whose vector has smallest (e.g., Euclidean) distance to that net's output. Note that the nearest neighbor computation mentioned above is not necessarily used during training.

Overfitting

A general problem with modeling is that models can be overfitted to the training data. In some implementations, the language prior model can avoid overfitting by choosing the sentence weights that are used in each net from a fixed number of weights. Thus, the nets can share weights, e.g., more than one of the sentence matrices in the various nets can have an instance of a given weight. This can prevent circumstances where the language prior model can generate any sentence with zero error, but has not necessarily learned any information that applies to sentences outside of the training data.

As noted above, the rescaling to unit length can help prevent convergence to the trivial all-zeros solution. Recall that the mean word vector is subtracted from each word vector, and that this can be done both at initialization and after each epoch.

Machine Translation

Once trained, the language prior model can be used for various applications. For example, the language prior model can be used for machine translation from a source language to a target language as discussed below. Separate language prior models can be generated for both the source and target languages. First, a large number of training sentences can be gathered for both the source language (e.g., English) and the target language (e.g., Italian).

The sentences can be represented in various formats, but for the purposes of discussion, each language can have a corresponding file of sentences. Note that the numbers of sentences in each file can be different. Moreover, the sentences in each file can be different, e.g., there may be English sentences in the English file with no Italian sentences in the Italian file that have the same meaning.

However, it is generally desirable that the sentences in the two data files reflect the language that the machine translation system is expected to encounter. For example, if the machine translation system is expected to generate conversational Italian, it may not be desirable to use data files that only include news articles. This is because the individual language prior models tend to reflect the sentences from which they are trained.

Once appropriate English and Italian sentences are obtained, the two language prior models can be trained. Recall that the language prior models can be generated using unlabeled training data, as discussed above. For machine translation, labeled data can be used in conjunction with the two language prior models to perform the translation task. Particularly, labeled data in the form of paired sentences can be used to perform the translation. Generally speaking, the labeled data can include English sentences with their corresponding translations into Italian. For many applications (e.g., common languages), there may be readily available labeled training sets with paired sentence translations.

A machine translation system using the two language prior models can be implemented as follows. First, the English sentences from the labeled training data can be passed through the English language prior model. Likewise, the corresponding Italian translations can be passed through the Italian language prior model. The result is two sentence vectors in $\mathcal{R}^m$. Then, given N such pairs of sentences, there are a set of paired vectors, $\{E_i, I_i\}$, i=1, ..., N, where $E_i$ denotes the ith English sentence (mapped to vector form), and $I_i$ denotes the ith Italian sentence (mapped to vector form).

The pairs of sentence vectors can be saved after being passed through the corresponding language prior models. Then, the sentence vectors can be used to train a separate model $\mathcal{M}$ (e.g., a neural net with M inputs and M outputs, e.g., the length of the sentence vectors) that maps the output of the English language prior model, the vector $E_i$, to the output of the Italian language prior model, the vector $I_i$. When the neural net model has been trained, a new English sentence $E_0$ can be translated as follows. First, $E_0$ is run through the English language prior model. The resulting vector is mapped from $\mathcal{R}^m$ to $\mathcal{R}^m$ using $\mathcal{M}$. The Italian language prior model can be used to "reverse" map the resulting vector back to a translated sentence in Italian.

Generally speaking, the translation technique discussed above is particularly suitable when two vectors that are close in $\mathcal{R}^m$ correspond to two sentences that are (1) both grammatical and semantically correct and (2) have similar meanings. By using sufficient unlabeled data to train the two language prior models, the language prior models can reflect the underlying sentence structures of sentences in the two languages. In the implementation discussed herein, relatively small amounts of labeled training data are used for the actual translation model, e.g., the neural net mentioned above. Note that this translation technique can also be used for testing purposes by comparing translated sentences generated by the language prior model with an expected translation.

Disambiguation

The language prior models discussed herein can also be used for word sense disambiguation. Consider the word "jack," which has various noun meanings (mechanism for lifting a car, playing card, etc) as well as different verb meanings. Given context (e.g., a sentence, paragraph, etc.) a human can tell which meaning was intended by the author, but this is not necessarily the case for a machine. The following describes building a disambiguation system using a language prior model built using unlabeled training data.

First, train the language prior model as discussed above, e.g., using one million English sentences. Next, train one more epoch, this time computing the variance of the gradient vectors of the word vectors. Note that the variance here is the trace of the covariance matrix and is the sum squared deviation of the vectors from their mean. Now, identify which word has highest variance. Next, a (machine) dictionary can be checked to determine whether this word has more than one meaning. If not, there is no reason to disambiguate and the processing can stop. Otherwise, another training epoch can be performed. This time, each incremental gradient vector can be saved for the highest variance word.

Next, eigenvectors of the covariance matrix of the gradients can be computed. Of these eigenvectors, a subset can be selected that accounts for a threshold amount, e.g., 90%, of the variance of the word. Suppose that this results in four eigenvectors. Four new identical word vectors can be created, each equal to the original. The e-vectors can be renormalized to, e.g., length 1/10 and added to the corresponding new word vector for each meaning. Then, after adding the eigenvectors, the new word vectors can be renormalized to length one.

Next, another training epoch can be performed, keeping the words fixed except for these four word vectors, each of which represents a different meaning for the original word. When training a given sentence, the objective function value can be tested for each of the four words. The smallest value can be used to indicate which meaning of the word is being used in that particular sentence. If the same word occurs more than once in a given sentence, each combination of words can be so tested. This can be repeated to disambiguate the next highest-variance word and so on until the next highest-variance word only has one meaning in the dictionary.

Disambiguation Testing

One way to test disambiguation is to use humans to determine whether the correct meaning is discerned, e.g., by providing the determined meanings to a user for evaluation. If the disambiguation has been performed correctly for a given word meaning, then the word has consistent actual meanings in the sentences in which that determined meaning appears. One way to validate the disambiguation is to use a dictionary definition of the word. For example, "A jack is a portable device that uses a mechanical or hydraulic lifting system to raise heavy objects, especially cars, a short distance."

Modeling component 103 can compute the score for the dictionary sentence by modeling it with the language prior model and summing the squared distances from the output of each net to its closest word. This value can be divided by the number of words in the sentence to get a mean squared error. Thus, scores of sentences of differing lengths can be compared. The sentence with the lowest score can be taken as the meaning, and modeling component 103 can declare that this particular dictionary sentence is the definition for that word. Human judges can be used to check that the way the language prior model is using the word is consistent with this claimed meaning.

CONCLUSION

The above discussion provides various applications where the language prior model can be applied. However, the language prior model is also suitable for use in other specific contexts, e.g., matching queries to keywords for ads, automated chat, etc. More generally, the language prior model can be trained and used to provide information about the meaning of words and how words interrelate.

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by a computing device for creating a model structure, the method comprising:
creating multiple submodels comprising sentence weights that are assigned to a sentence comprising multiple words having assigned word weights, the multiple submodels including an individual submodel that comprises an individual sentence weight;
arranging the multiple submodels in layers based on a selected permutation of the multiple words of the sentence;
assigning, as an input to the individual submodel, an individual word weight that is assigned to an individual word of the sentence; and
defining the model structure to include the multiple submodels arranged in the layers,
wherein the individual submodel is configured to perform an operation on the individual sentence weight assigned to the sentence and the individual word weight assigned to the individual word of the sentence.

2. The method according to claim 1, wherein the individual sentence weight is included in at least two of the multiple submodels.

3. The method according to claim 1, wherein the selected permutation is an inverse frequency permutation based on how frequently the multiple words of the sentence appear in a training lexicon.

4. The method according to claim 1, further comprising:
update the sentence weights and the word weights using a gradient of an objective function with respect to outputs of the multiple submodels.

5. The method according to claim 1, further comprising:
assigning different subsets of the sentence weights to each of the multiple submodels.

6. The method according to claim 1, wherein the word weights comprise vectors of word weights and the individual word weight is part of an individual vector of word weights assigned to the individual submodel.

7. A system for training a model comprising parameterized representations of lexical units, the system comprising:
one or more computer-readable storage media storing instructions configured to:
select a lexical structure comprising the lexical units;
create a model structure comprising a path through submodels, the path being based on an order of the lexical units in the lexical structure and a selected permutation of the lexical units; and adjust the parameterized representations of the lexical units using individual submodels along the path such that outputs of the individual submodels become relatively closer to the parameterized representations of the lexical units; and at least one computing device configured to execute the instructions.

8. The system according to claim 7, wherein the instructions are configured to:

adjust another parameterized representation of the lexical structure such that the outputs of the individual submodels become relatively closer to the parameterized representations of the lexical units.

9. The system according to claim 7, wherein the submodels are arranged in layers and each layer has only one of the submodels on the path.

10. The system according to claim 7, wherein the lexical units and the lexical structure are unlabeled.

11. The system according to claim 8, wherein the parameterized representations of the lexical units comprise vectors of floating point weights.

12. The system according to claim 11, wherein the another parameterized representation of the lexical structure comprises another vector of floating point weights.

13. The system according to claim 12, wherein at least one submodel along the path performs a mathematical operation on an individual vector representing a default lexical unit and an individual floating point weight from the another vector of floating point weights representing the lexical structure.

14. The system according to claim 7, wherein the selected permutation reflects a frequency of the lexical units in a lexicon.

15. One or more computer-readable storage media comprising instructions which, when executed by one or more processing devices, cause the one or more processing devices to perform acts comprising:

accessing a parameterized representation of a first lexical structure;

computing outputs for individual submodels of a model structure using the parameterized representation of the first lexical structure;

identifying lexical units based on the outputs of the individual submodels;

selecting a path through the model structure based on distances between the outputs and the identified lexical units; and outputting a second lexical structure comprising the identified lexical units along the path.

16. The one or more computer-readable storage media according to claim 15, wherein the first lexical structure comprises a first sentence, the lexical units comprise words, and the second lexical structure comprises a second sentence.

17. The one or more computer-readable storage media according to claim 16, the acts further comprising:

testing individual outputs along the path by comparing the second lexical structure.

18. The one or more computer-readable storage media according to claim 15, wherein the path is identified using a graphing algorithm or a nearest neighbor technique for the outputs of the individual submodels.

19. The one or more computer-readable storage media according to claim 15, wherein the path is taken in increasing order of frequency of the lexical units in a lexicon.

20. The one or more computer-readable storage media according to claim 15, wherein the path is a shortest path through the model structure.

* * * * *